United States Patent
Watanabe (10) Patent No.: US 7,602,292 B2
(45) Date of Patent: Oct. 13, 2009

(54) CONTAINER BOX WITH RFID TAG

(75) Inventor: Atsushi Watanabe, Toyokawa (JP)

(73) Assignee: Denso Wave Incorporated, Tokyo (JP)

(*) Notice: Subject to any disclaimer, the term of this patent is extended or adjusted under 35 U.S.C. 154(b) by 287 days.

(21) Appl. No.: 11/586,552

(22) Filed: Oct. 26, 2006

(65) Prior Publication Data
US 2007/0103312 A1    May 10, 2007

(30) Foreign Application Priority Data
Oct. 26, 2005    (JP)    ............ 2005-311305

(51) Int. Cl.
*G08B 13/14*    (2006.01)
(52) U.S. Cl. .................................. 340/572.1
(58) Field of Classification Search ... 340/572.1–572.9, 340/10.1; 343/841
See application file for complete search history.

(56) References Cited

U.S. PATENT DOCUMENTS

| | | | | |
|---|---|---|---|---|
| 6,008,727 | A | * | 12/1999 | Want et al. ............. 340/572.1 |
| 7,151,455 | B2 | * | 12/2006 | Lindsay et al. .......... 340/572.3 |
| 2003/0174099 | A1 | * | 9/2003 | Bauer et al. .............. 343/893 |
| 2004/0196152 | A1 | * | 10/2004 | Tice ...................... 340/539.26 |
| 2006/0086808 | A1 | * | 4/2006 | Appalucci et al. ........... 235/492 |
| 2006/0220868 | A1 | | 10/2006 | Takasawa et al. |

FOREIGN PATENT DOCUMENTS

| | | |
|---|---|---|
| DE | 19840251 B4 | 3/2000 |
| DE | 202005006365 | 6/2005 |
| JP | A-2003-198422 | 7/2003 |
| JP | 2004-164055 | 6/2004 |

OTHER PUBLICATIONS

Search Report from Singapore Patent Office issued on Feb. 22, 2007 for the corresponding Singapore patent application No. 200607456-1 (a copy and English translation thereof).
German Office Action issued Jun. 19, 2007 in corresponding patent application No. 10 2006 050 344.9-27.

* cited by examiner

*Primary Examiner*—Phung Nguyen
(74) *Attorney, Agent, or Firm*—Posz Law Group, PLC (57) ABSTRACT

A container box is provided to carry goods. The container box comprises a body and the metal sheet applied to the body. The body accommodates the goods therein and comprises a plate member forming part of the body. The plate member has a tag mounting portion thereon and an RFID (radio frequency identification) tag is applied to the tag mounting portion for communication on radio waves. The metal sheet is arranged inside the plate member in a direction along which the radio waves are transmitted and received. The metal sheet is for blocking the radio waves from being transmitted inside the body.

20 Claims, 6 Drawing Sheets

CONTAINER BOX WITH RFID TAG

CROSS-REFERENCE TO RELATED APPLICATION

This application is based on and claims the benefit of priorities from earlier Japanese Patent Application No. 2005-311305 filed on Oct. 26, 2005 the description of which is incorporated herein by reference.

BACKGROUND OF THE INVENTION

1. Technical Field

The present invention relates to a container box for accommodating goods in a main body and for carrying them, and in particular, to a container box using an RFID (radio frequency identification) tag.

2. Related Art

In administering various commercial goods or products recently, there is an increasing use of RFID tags in each of which required information is stored in a memory thereof in a readable/writable manner. For example, in convenience stores or factories, administration of incoming/outgoing goods may be carried out by applying an RFID tag onto each of container boxes used for carrying commercial goods or products, by allowing communication between the RFID tag and an external interrogator (also referred to as a "reader/writer") through radio waves at a predetermined frequency, and by allowing the interrogator to read the information written into the memory in the RFID tag. In this case, when the contents accommodated in a container box are plastic products or dry goods, it is unlikely that adverse effects are imparted to a reading distance for the RFID tag. However, when the contents include liquid or metal cargo, the reading distance for the RFID tag is very often varied to disable steady reading.

This is because radio waves used for communication between the RFID tag applied to the container box and the external interrogator are absorbed by water or reflected by metal in the contents of the container box, making a radio waves condition different from the one where nothing is present around the RFID tag, and thus the reading distance for the RFID tag is significantly varied.

As one approach for resolving such a problem, an RFID tag has been developed, in which a metal plate is applied in advance to a rear of the RFID tag so as to be less affected even when the RFID tag is directly applied to metal or liquid cargo. For example, Japanese Patent Application Laid-Open No. 2004-164055 discloses an arrangement in which an RFID tag using a microwave zone (2.45 GHz) or a UHF zone (935 MHz) as a communication frequency is applied to a metal plate via a dielectric to ensure a certain distance between a rear of an antenna element and a metal plate.

In this arrangement, transmitted radio waves and radio waves reflected from the metal plate, when having reached a surface of the antenna of the RFID tag, have a lower tendency to interfere with each other for counteraction, and thus can provide steady reception sensitivity.

However, such an RFID tag is not suitable for use by being applied to a container box, because it has too large a thickness of 5 mm or more to provide a sufficient flexibility, and because it is more expensive comparing with commonly used RFID tags. Another approach has also been made to develop an RFID tag employing a Teflon® substrate or a glass epoxy substrate. However, such an RFID tag still has a thickness of 1 mm or more, providing no difference due to the fact that flexibility is insufficient, and that cost is high compared with commonly used RFID tags. Therefore, such an RFID tag is again not suitable for use being applied to a container box.

SUMMARY OF THE INVENTION

The present invention has been made in view of the circumstances provided above, and has an object of providing a container box which is adapted to provide stable communication between an RFID tag in position and an external interrogator even when metal or liquid cargo is accommodated in the body.

In order to realize the above object, as one aspect of the present invention, there is provided a container box for carrying goods, comprising: a body accommodating the goods therein and comprising a plate member forming part of the body, the plate member having a tag mounting portion thereon and an RFID (radio frequency identification) tag being applied to the tag mounting portion for communication on radio waves; and a metal sheet, arranged inside the plate member in a direction along which the radio waves are transmitted and received, for blocking the radio waves.

Accordingly, even if the container box accommodates goods containing metal or liquid as a whole or partially, radio waves are able to communicate with the RFID tag without an influence or with less influence which is due to the reflection and/or absorption of the radio waves from and/or into the goods. The communication can be performed with the RFID tag in a stable manner, increasing reliability of the communication.

Preferably, the tag mounting portion is formed on an outside surface of the plate member.

Still preferably, the body comprises a box-shaped trunk portion having a first opening and a first cover covering the first opening, the tag mounting portion is formed on a side of the first cover made to be opposed to a side of the trunk portion when the first cover is placed to cover the first opening of the trunk portion, the first cover serving as part of the plate member, and the metal plate is arranged on the side of the trunk portion which is opposed to the side of the first cover on which the tag mounting portion is formed.

It is preferred that the metal plate is equal or larger in areal size to or than the tag mounting portion.

It is also preferred that the metal plate is made of either an aluminum foil having either an adhesive or a sticker, or a resin-film-laminated aluminum foil having either an adhesive or a sticker.

It is also preferred that the tag mounting portion is formed on part of the plate member, the part of the plate member having a thickness that allows a distance between the RFI tag and the metal plate to an amount equal to or more than $\frac{1}{32}$, still preferably $\frac{1}{16}$, of a wavelength of the radio waves.

DETAILED DESCRIPTION OF THE PREFERRED EMBODIMENTS

Hereinafter is described some embodiments of a container box related to the present invention with reference to the accompanying drawings.

First Embodiment

With reference to FIGS. 1A to 4, a first embodiment of the present invention will now be described first.

Figure 1A:
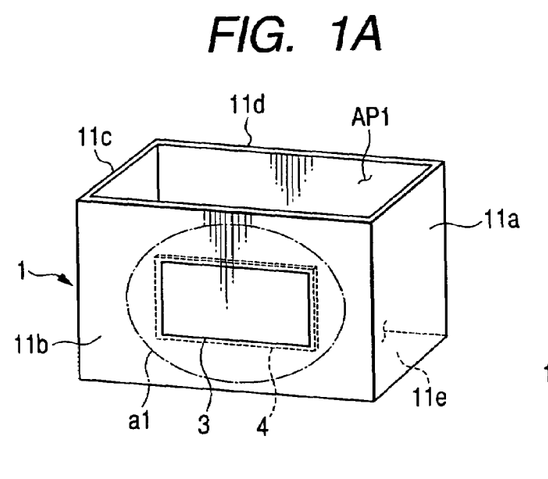
FIG. 1A illustrates a perspective appearance of a container box before an RFID tag is applied thereto, according to a first embodiment of the present invention.
Figure 1B:
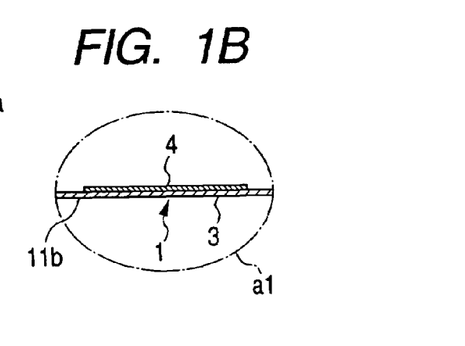
FIG. 1B is a partial cross section of a portion shown by a reference "a1" in FIG. 1A.
Figure 2A:
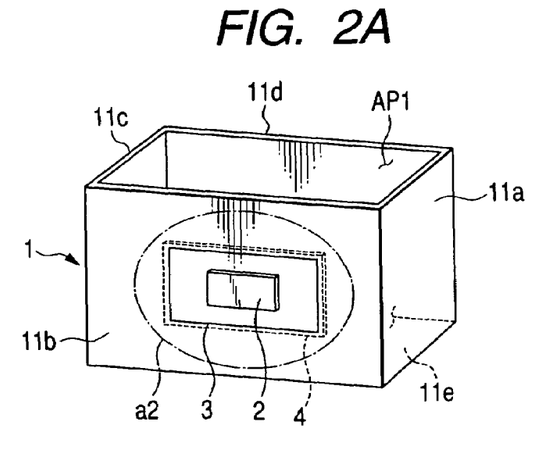
FIG. 2A illustrates a perspective appearance of the container box illustrated in FIG. 1A now applied with an RFID tag.
Figure 2B:
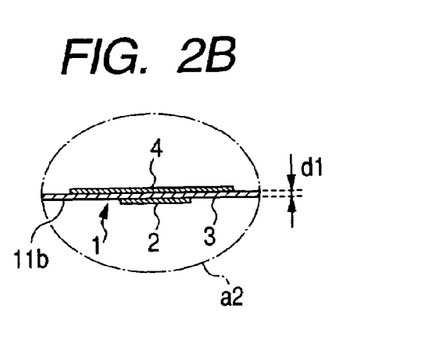
FIG. 2B is a partial cross section of a portion shown by a reference "a2" in FIG. 2A.

As shown in FIG. 1A, a container box 1 of the present embodiment has a main body having a shape of a rectangular box with an opening AP1 at a top thereof. The main body is made up of plate members, or four side plates 11a to 11d, and a bottom plate (lower plate) 11e. Among the plate members constituting the main body, the side plate 11b located this side of FIG. 1A is integrally provided with a tag mounting portion 3 at a center portion on an outer surface thereof. FIG. 1B shows a cross section associated with the tag mounting portion 3. As can be seen from FIG. 1B, a thickness of the tag mounting portion 3 is configured to be the same as a thickness of the side plate 11b. As shown in FIGS. 2A and 2B, an outer surface of the tag mounting portion 3 is so arranged that an RFID tag 2 can be applied thereto.

Further, as shown in FIG. 1B, a metal sheet 4, which is the inventive metal body, is applied inside the container box 1 so as to be positioned at a rear (on an inner surface of the side plate 11b) of the tag mounting portion 3 through the side plate 11b.

The metal sheet 4 is made of an aluminum foil having an adhesive or a sticker, or a resin-film-laminated aluminum foil having an adhesive or a sticker, with its outer size (i.e., areal size) being set to be equal to or larger than the tag mounting portion 3. As shown in FIGS. 2A and 2B, when the RFID tag 2 is applied to the tag mounting portion 3, such a positional relation in the radio-wave transmission/reception direction is established that the RFID tag 2 is positioned opposed to the metal sheet 4 with the tag mounting portion 3 therebetween. As shown in FIG. 2B, a distance "d1" between the RFID tag 2 and the metal sheet 4 is defined by a thickness of the tag mounting portion 3, i.e. a thickness of the side plate 11b.

Figure 3:
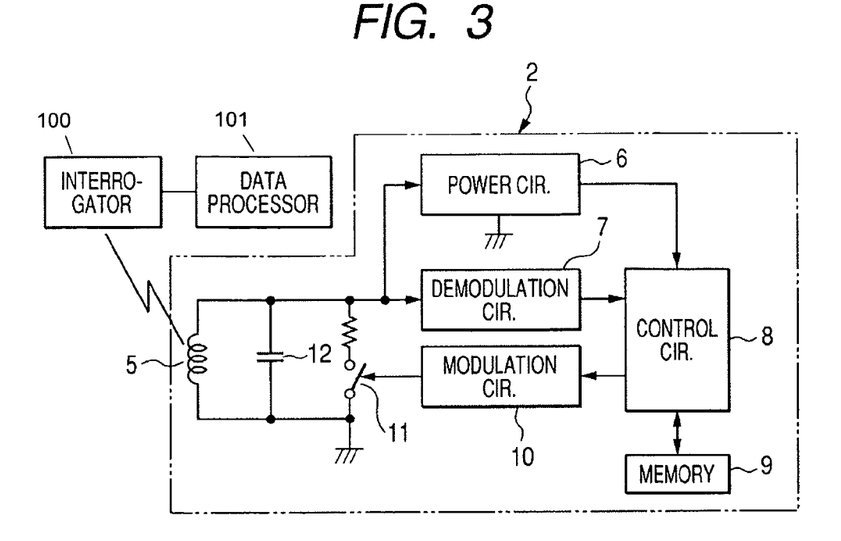
FIG. 3 is a block diagram showing an electrical configuration of the RFID tag applied to the container box according to the first embodiment, and showing a whole configuration of a container administering system including the RFID tag.

FIG. 3 shows an electrical configuration of the RFID tag 2 to be applied onto the container box 1. As shown in the figure, the RFID tag 2 constitutes a container administering system (RFID system) together with an externally located interrogator 100 and a data processor 101, such as a computer, which is connected to the interrogator 100 in a communicable manner.

Before describing an internal configuration of the RFID tag 2, the interrogator 100 is briefly explained. The interrogator 100 includes an antenna, a receiver/transmitter for performing radio communication with the RFID tag 2 at a predetermined frequency through the antenna, a controller for controlling operations of individual portions in the interrogator 100, including the receiver/transmitter, and an interface capable of communicating with the data processor 101. After receiving instructions data from the data processor 101 through the interface, the controller commands the receiver/transmitter to modulate carrier waves of the predetermined frequency by using digital signals (base band signals) corresponding to the data, and to transmit the modulated waves in the form of radio waves to the RFID tag 2 through the antenna. On the other hand, upon reception of radio waves transmitted from the RFID tag 2 through the antenna, the controller commands the receiver/transmitter to demodulate modulated waves corresponding to the radio waves to read out the original digital signals, and to transmit the data to the data processor 101 through the interface. As a known configuration is applied here, detailed description on the interrogator 100 is omitted.

As shown in FIG. 3, the RFID tag 2 includes an antenna 5, a power circuit 6, a demodulator circuit 7, a control circuit 8, a memory 9, a modulation circuit 10, and a load modulation circuit 11. A capacitor 12 is connected parallel to the antenna 5 of the RFID tag 2. The load modulation circuit 11 is made up of a series circuit which consists of a resistor and a switch, and is connected parallel to the antenna 5.

Upon reception of carrier signals (i.e. the waves which have been modulated by base band signals and made up of carrier waves) transmitted from the interrogator 100 via the antenna 5, the RFID tag 2 rectifies the carrier signals in the power circuit 6 to produce operational power, and supplies the operational power to the control circuit 8 constituted of a microcomputer, and to other components. Transmit data from the interrogator 100 superimposed on radio waves is demodulated and decoded by the demodulator circuit 7, and outputted to the control circuit 8. The control circuit 8, when transmitting data to the interrogator 100, reads out data stored in the memory 9 for output to the modulation circuit 10. When a write command is transmitted from the interrogator 100, data transmitted with the command is written into the memory 9.

When the data read out from the memory 9 by the control circuit 8 is outputted to the modulation circuit 10, the modulation circuit 10 effects BPSK (binary phase shift keying) modulation to sub-carrier signals that have been produced through frequency dividing of the carrier signals, using the encoded data read out from the memory 9, and outputs the BPSK modulated signals to the load modulation circuit 11. In the load modulation circuit 11, the switch is turned on/off according to the BPSK modulated signals to perform load modulation. The carrier signals are then subjected to ASK (amplitude shift keying) modulation, so that the ASK modulated waves, i.e. radio waves corresponding to answer signals, are returned to the interrogator 100 through the antenna 5.

Figure 4:
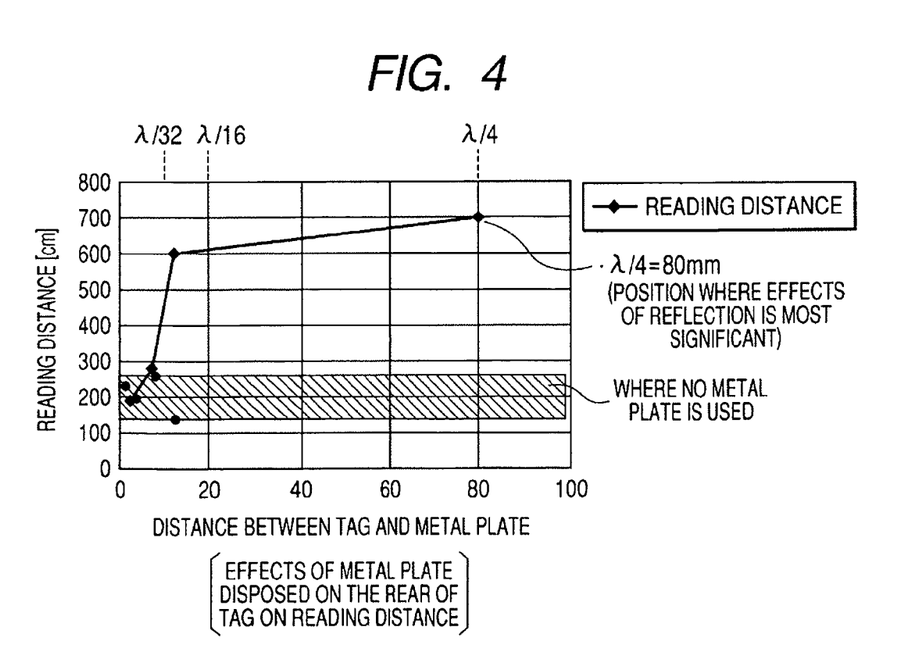
FIG. 4 is a graph for explaining an influence of a metal body, or a metal sheet, on a reading distance, which is arranged at a rear of the RFID tag used in the first embodiment.

An operation of the present embodiment is described referring to FIG. 4 as well. FIG. 4 is a graph showing how a reading distance varies when the metal sheet 4 is located at the rear of the RFID tag 2 as illustrated in FIG. 2. In the graph, the horizontal axis indicates a distance [mm] between the RFID tag 2 and the metal sheet 4, and the vertical axis indicates a reading distance [cm] of the RFID tag 2. It should be noted that, in FIG. 4, the portion represented by the oblique lines indicates a range in which a reading distance has varied in the absence of the metal sheet 4 (measured values are plotted by filled-in circles).

In the example of FIG. 4, communication between the RFID tag 2 and the interrogator 100 utilizes radio waves at a frequency of 953 MHz (wavelength λ: about 320 mm), for example, which belong to UHF (ultra high frequency) zone. Radio waves transmitted from the interrogator 100 are reflected and shut out by the metal sheet 4 which is applied to the RFID tag 2 so as to face the rear of the RFID tag 2, and thus are unlikely to reach the contents of the container box 1. In other words, if metal or liquid cargo is contained in the contents, radio waves used for communication are barely affected by the reflection and absorption caused by the contents, so that communication with the RFID tag 2 can be stably performed.

As shown in FIG. 4, exceedingly short distance between the RFID tag 2 and the metal sheet 4 causes the radio waves reflected from the metal sheet 4 to create interference and thus to develop adverse effects on communication characteristics. Therefore, the above distance is set at one thirty-second or more, or desirably one sixteenth or more, of the wavelength λ of the radio waves used for communication. For example, in case of the RFID tag system using the radio waves at a frequency of 953 MHz as mentioned above, the wavelength λ is around 320 mm. Thus, it is desirable to design a thickness (see "d1" of FIG. 2B) of a plate member constituting the main body of the container box 1 so that the RFID tag 2 and the metal sheet 4 are distanced from each other by one sixteenth of the wavelength λ, which is equal to or larger than λ/16=320/16=20 mm.

Further, as shown in FIG. 4, if the distance between the RFID tag 2 and the metal sheet 4 is set at one fourth of the wavelength λ of the radio waves used for communication, which is equal to λ/4=320/4=80 mm, the transmitted radio waves and the radio waves reflected from the metal sheet 4, when having reached the antenna surface of the RFID tag 2, are in a state of being maximally intensified with each other by the phase relation between both of the radio waves. As a result, much more stabilized reception sensitivity can be achieved.

As described above, according to the present embodiment, the metal sheet 4 is applied to the inner surface of the container box 1 in such a way as to be positioned at the rear of the tag mounting portion 3. The influence of reflection and/or absorption of the radio waves can be lessened or almost avoided. Hence, the data of the RFID tag 2 applied to the tag mounting portion 3 can be stably read out even when metal or liquid cargo is accommodated in the container box 1, resulting in a stable, reliable communication.

In addition, by suitably setting a distance between the RFID tag 2 and the metal sheet 4 according to a relation to the wavelength λ of the radio waves to be used for communication, or specifically, by setting the distance at one sixteenth or more of the wavelength λ, a communication range for the RFID tag 2 can be much increased.

Moreover, since the metal sheet 4 is made of an aluminum foil having an adhesive or a sticker, or a resin-film-laminated aluminum foil having an adhesive or a sticker, when arranging the metal sheet 4, the metal sheet 4 can be readily applied without the necessity of separately applying an adhesive or a sticker thereto.

Second Embodiment

FIGS. 5 and 6 illustrate a second embodiment of the present invention. The following description is mainly associated with portions different from the first embodiment. In the second embodiment, the identical or similar components to those in the first embodiment are given the same references for the sake of a simplified explanation.

Figure 5A:
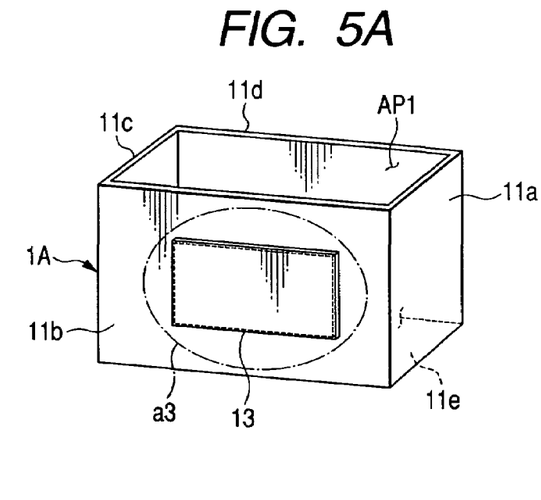
FIG. 5A illustrates a perspective appearance of a container box before an RFID tag is applied thereto, according to a second embodiment of the present invention.
Figure 5B:
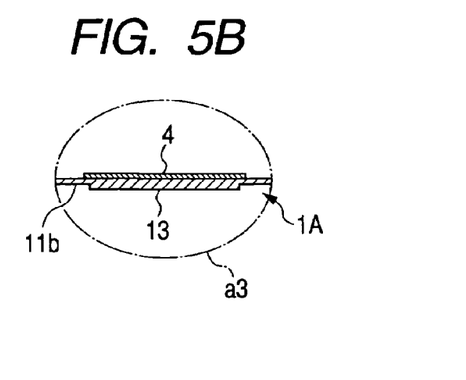
FIG. 5B is a partial cross section of a portion shown by a reference "a3" in FIG. 5A.
Figure 6A:
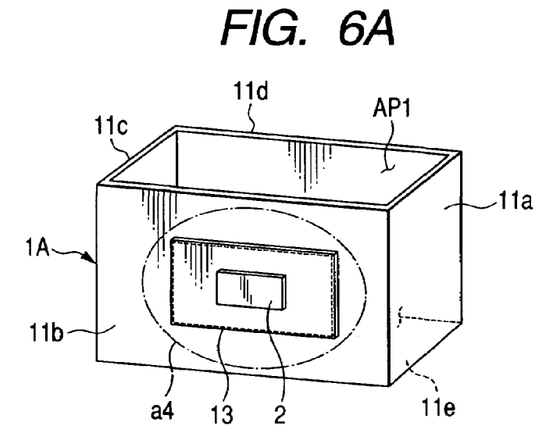
FIG. 6A illustrates a perspective appearance of the container box illustrated in FIG. 5A now applied with an RFID tag.
Figure 6B:
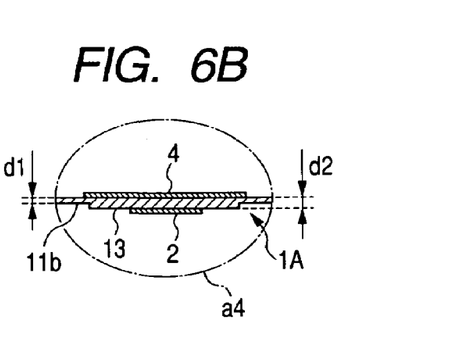
FIG. 6B is a partial cross section of a portion shown by a reference "a4" in FIG. 6A.

As shown in FIG. 5A, a container box 1A of the present embodiment has a main body having a shape of a rectangular box made up, as in the first embodiment, of plate members (four side plates 11a to 11d and the bottom plate (lower plate) 11e). Among the plate members constituting the main body, the side plate 11b is integrally provided, as shown in FIG. 5B, with a tag mounting portion 13 at a center portion thereof. As shown in FIGS. 6A and 6B, the tag mounting portion 13 is configured so that the RFID tag 2 can be applied thereto. The metal sheet 4, which is the inventive metal body, is applied inside the container box 1A so as to be positioned at a rear of the tag mounting portion 13 through the side plate 11b.

As shown in FIG. 6B, in the container box 1A, a thickness "d2" of the plate member (side plate 11b) constituting the tag mounting portion 13 is made larger than the thickness "d1" of the remaining portion of the plate member (d2>d1). In this regard, in the plate member constituting the main body of the container box 1A, the thickness of only the portion structured as the tag mounting portion 13 may be determined based on the wavelength λ of the radio waves used for communication between the RFID tag 2 and the interrogator 100, as in the first embodiment.

As described above, according to the second embodiment, the distance between the RFID tag 2 to be applied and the metal sheet 4 can be optimized by adjusting the thickness "d2" of the tag mounting portion 13 provided to the main body of the container box 1A. Such an arrangement allows for freedom in setting the thickness of the portion other than the tag mounting portion 13 in the plate member constituting the main body of the container box 1A, whereby the increase of weight of the container box 1A may be suppressed.

Third Embodiment

Figure 7A:
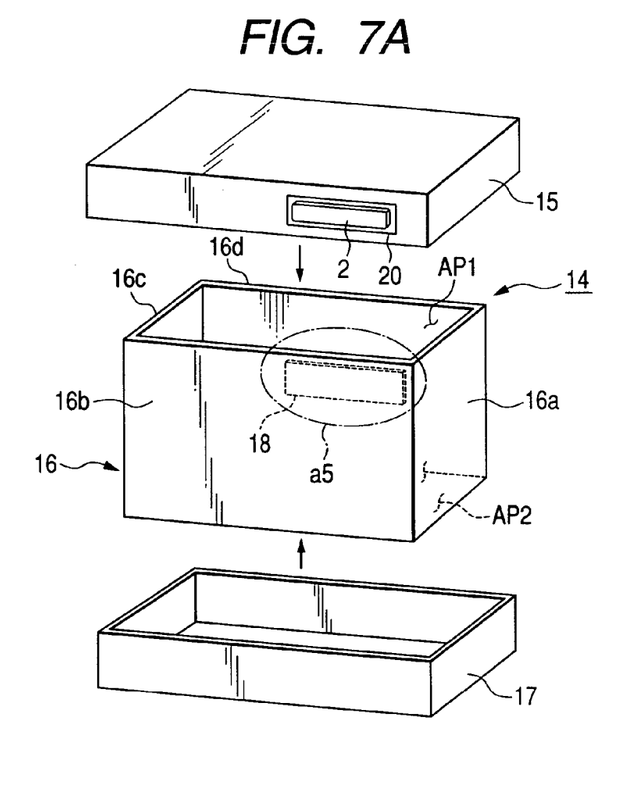
FIG. 7A illustrates a perspective appearance of a folding container box before being assembled, according to a third embodiment of the present invention.
Figure 7B:
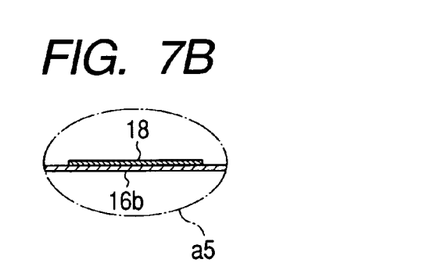
FIG. 7B is a cross section of a portion shown by a reference "a5" in FIG. 7A.

FIGS. 7 and 8 illustrate a third embodiment of the present invention. In the following description, the identical or similar components to those in the first embodiment are given the same references and explanation therefor is omitted. Thus, the description below is principally directed to components different from the first embodiment.

As shown in FIG. 7A, a main body of a folding container 14, which corresponds to the container box according to the present invention, comprises an upper cover (first cover) 15, a trunk portion 16 made up of four side plates 16a, 16b, 16c and 16d which are assembled in a manner that they can be disassembled, and a lower cover (second cover) 17 having the same shape as the upper cover 15. The upper cover 15 and the lower cover 17 are each made up of a rectangular top plate and four side plates arranged at four sides of the top plate. An outer size of the lower cover 17 (length×width) is made slightly smaller than that of the upper cover 15. The trunk portion 16 is provided with an upper opening (first opening) AP1 as well as a lower opening (second opening) AP2.

The trunk portion 16 is assembled, although not specifically shown, by employing aluminum support pillars, for example, each having grooves for fitting thereto ends of the side plates 16a to 16d, or by forming notches or projections, for example, at both ends of each of the side plates 16a to 16d for fitting with each other.

As shown in FIG. 7A, a tag mounting portion 20 is provided on an outer surface of the side plate located this side of the figure, i.e. at a predetermined position on the right of a center portion of FIG. 7A, with the RFID tag 2 being applied to an outer surface of the tag mounting portion 20. A metal sheet 18, which corresponds to the inventive metal body, is applied to an inner surface of the side plate 16b constituting the trunk portion 16 so as to be located at a predetermined position, i.e. at an upper right portion with respect to a center portion of FIG. 7A. This metal sheet 18 is made of the same material as that of the metal sheet 4 in the first embodiment, and has an outer size larger than that of the tag mounting portion 20.

Figure 8A:
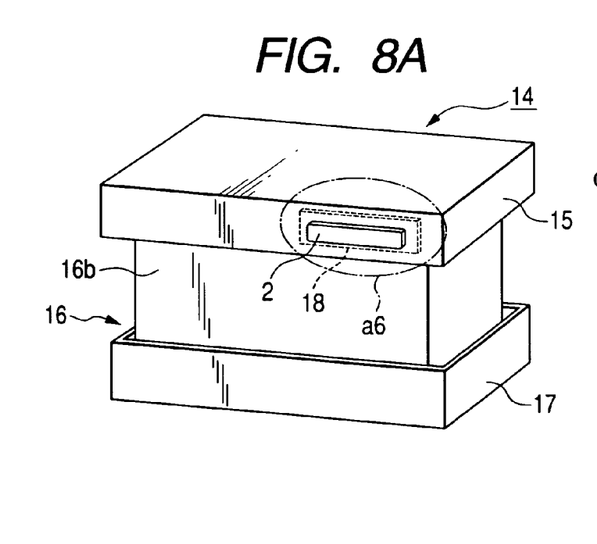
FIG. 8A illustrates a perspective appearance of the folding container box illustrated in FIG. 7A now assembled.

As shown in FIG. 8A, the folding container 14 is assembled with the lower cover 17 being arranged over a lower opening AP2 of the trunk portion 16, and the upper cover 15, over an upper opening AP1. This state provides a positional relation, in which the RFID tag 2 applied to the upper cover 15 and the metal sheet 18 applied to the trunk portion 16 are opposed to each other with the interposition therebetween of members constituting the upper cover 15 and the trunk portion 16. It should be noted that, in FIG. 8A, illustration of the tag mounting portion 20 is omitted.

Figure 8B:
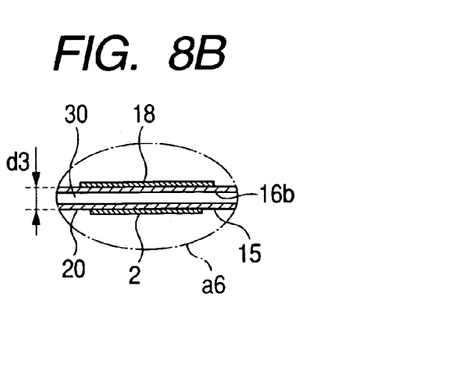
FIG. 8B is a cross section of a portion shown by a reference "a6" in FIG. 8A.

As in the first embodiment, dimensions of the upper cover 15 and the trunk portion 16 are determined so that a distance "d3" of 20 mm or more is ensured between the RFID tag 2 and the metal sheet 18 when the container 14 has been assembled as shown in FIG. 8B, i.e. the dimensions are determined including a gap 30 between the upper cover 15 and the trunk portion 16.

As described above, according to the third embodiment, the metal sheet 18 is applied to the inner surface of the side plate 16b, which constructs the trunk portion 16, so that, when the folding container 14 has been assembled, the metal sheet 18 is positioned at the rear of the RFID tag 2 which is applied to the upper cover 15. Therefore, if metal or liquid cargo is accommodated in the folding container 14, data of the RFID tag 2 can be stably read out as in the first embodiment. Further, as in the first embodiment, a communication range can be increased by suitably setting the distance "d3" between the RFID tag 2 and the metal sheet 18, which is determined when the folding container 14 has been assembled, in association with the wavelength λ of the radio waves used for communication.

Fourth Embodiment

FIGS. 9 and 10 illustrate a fourth embodiment of the present invention. In the following description, the identical and similar portions to those in the third embodiment are given the same references and explanation therefor is omitted. Thus, the description below is principally directed to only the portions different from the third embodiment.

Figure 9A:
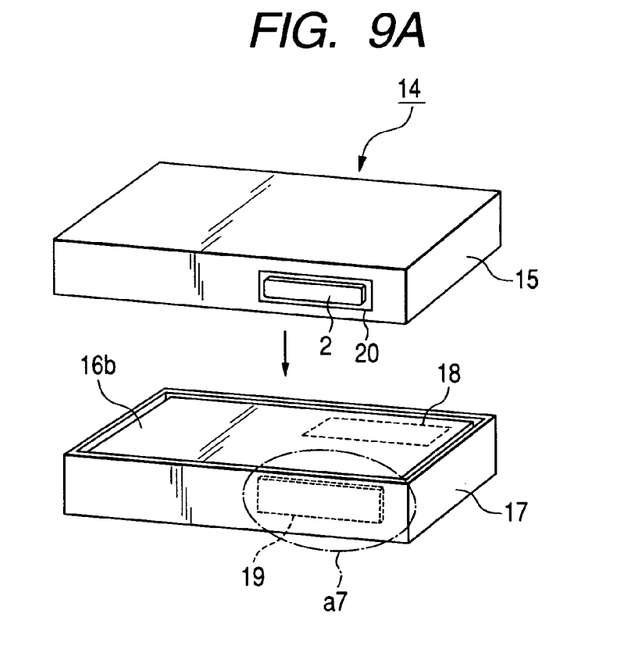
FIG. 9A illustrates a perspective appearance of a folding container box whose trunk portion has been disassembled and accommodated in a lower cover, according to a fourth embodiment of the present invention.

In the folding container box 14 of the present embodiment shown in FIG. 9A, a metal sheet 19, which corresponds to the inventive metal body, is applied to an inner surface of the side plate, which is located this side of the figure, among four side plates of the lower cover 17, so as to be positioned at a predetermined position, i.e. on the right of a center portion of the inner surface. This metal sheet 19 is also made of the same material as the one for the metal sheets 4 and 18 of the third embodiment, and has an outer size which is made larger than that of the tag mounting portion 20.

Figure 9B:
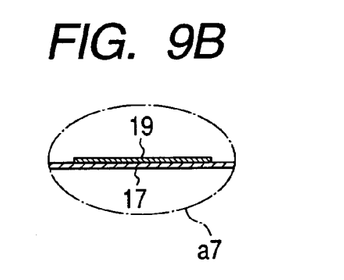
FIG. 9B is a cross section of a portion shown by a reference "a7" in FIG. 9A.
Figure 10A:
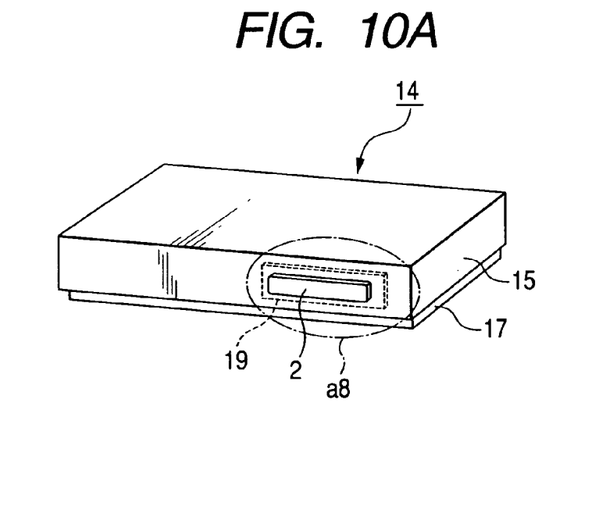
FIG. 10A illustrates a perspective appearance of a folding container box illustrated in FIG. 9A now folded.
Figure 10B:
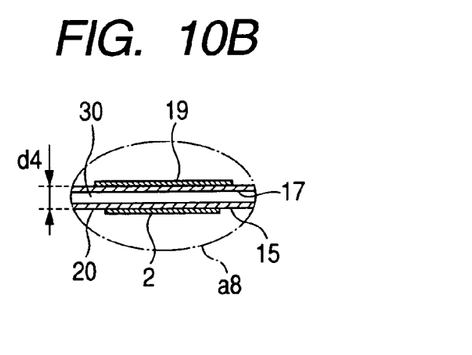
FIG. 10B is a cross section of a portion shown by a reference "a8" in FIG. 10A.

When folding the folding container 14, the trunk portion 16 is first disassembled (i.e., folded) into four side plates 16a to 16d as shown in FIGS. 9A and 9B. These side plates 16a to 16d are then accommodated inside the lower cover 17 being put one on the other. The lower cover 17 is then covered with the upper cover 15 as shown in FIGS. 10A and 10B. The folding container 14, in the state of being folded in this way, establishes a positional relation in which the RFID tag 2 applied to the upper cover 15 and the metal sheet 19 applied to the lower cover 17 are opposed to each other with the interposition therebetween of plate members constituting the upper cover 15 and the lower cover 17.

As in the third embodiment, dimensions of the upper cover 15 and the lower cover 17 are determined so that the distance "d4" of 20 mm or more is ensured between the RFID tag 2 and the metal sheet 18, including the gap 30 between the upper cover 15 and the lower cover 17, when both of the covers have been assembled together as shown in FIG. 10B.

As described above, according to the fourth embodiment, the metal sheet 19 has been applied to the inner surface of the lower cover 17 so that, when the folding container box 14 is folded, the metal sheet 19 is positioned at the rear of the RFID tag 2 which is applied to the upper cover 15. Therefore, when making communication with the RFID tag 2 with the folding container box 14 in the folded state, a communication range can be increased since the radio waves are reflected from the metal sheet 19.

The present invention is not intended to be limited to only the embodiments described above and illustrated in the drawings, but the following modifications or extensions may be made.

In each of the embodiments described above, the distance between the RFID tag 2 and the metal body should not be limited to one sixteenth of the wavelength λ of the radio waves used for communication between the RFID tag 2 and the interrogator 100, but may be set at one thirty-second or more (in the example of FIG. 4, λ/32=320/32=10 mm or more), which is still sufficient for enabling good communication. Alternatively, less than one sixteenth of the wavelength λ will also enable steady communication in comparison with a structure where no metal body is provided.

Alternatively, although the metal bodies have each been made up of the metal sheet 4, 18 or 19 of an aluminum foil material, these may be made up of plate-like metal bodies. Alternatively, the metal body may be a mesh metal body whose spacing is less than the wavelength λ of the radio waves used for communication. A structure obtained in this way may contribute to reducing the weight of the metal body.

Alternatively, the material used for the metal body may be iron, copper or other metal if only the metal reflects the radio waves used for communication between the RFID tag 2 and the interrogator 100.

Alternatively, an outer size of the metal body may not necessarily be larger than a size of the tag mounting portion, but may only be larger than at least an outer size of the RFID tag 2.

Figure 11A:
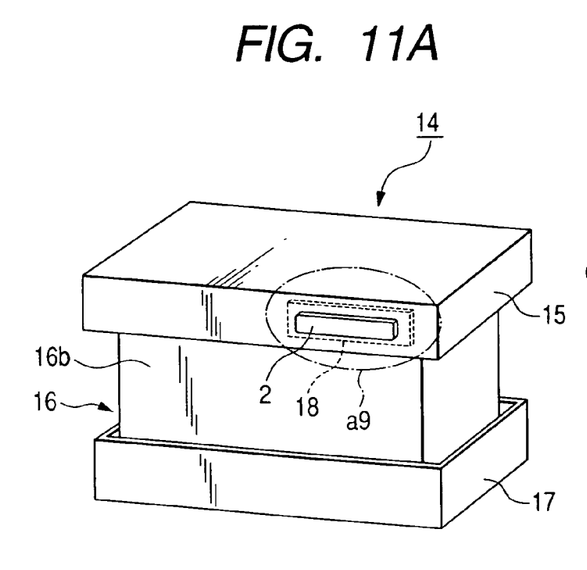
FIG. 11A illustrates a perspective appearance of a folding container box that has been assembled, according to a modification of the present invention.
Figure 11B:
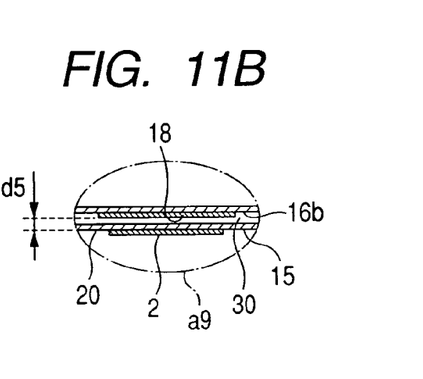
FIG. 11B is a cross section of a portion shown by a reference "a9" in FIG. 11A.

In the third embodiment, the metal sheet 18 has been applied to the inner surface of the side plate 16b, however, the metal sheet 18 may be applied to the outer surface of the side plate 16b as indicated in the modification shown in FIGS. 11A and 11B. In this case, the distance "d5" is ensured between the RFID tag 2 and the metal sheet 18.

In the fourth embodiment, the metal sheet 19 has been applied to the inner surface of the lower cover 17, however, the metal sheet 19 may be applied to the outer surface of the lower cover 17 as indicated in the modification shown in FIGS. 11A and 11B.

Further, in the third and forth embodiments, the tag mounting portion may be structured such that, like the second embodiment, the thickness of the tag mounting portion is thicker than the remaining of the side area of the side plate.

The metal body is not limited to the type which is arranged by being applied to the container box, but the metal body may be placed in a guide, for example, provided in the plate member constituting the main body of the container box. Alternatively, the metal body may be embedded in advance inside the plate member constituting the main body of the container box.

The same is applicable to the RFID tag. The RFID tag may be arranged in a guide provided in the plate member constituting the main body of the container box, or it may be embedded in advance inside the plate member constituting the main body of the container box.

Additionally, the radio waves used for communication between the RFID tag 2 and the interrogator 100 are not limited to those for UHF zone, but those which having a wavelength suitable for individual applications may be used.

For the sake of completeness, it should be mentioned that the various embodiments and modifications explained so far are not definitive lists of possible embodiments. The expert will appreciates that it is possible to combine the various construction details or to supplement or modify them by measures known from the prior art without departing is from the basic inventive principle.

What is claimed is:

1. A container box for carrying goods, comprising:
a body accommodating the goods in an inside of the body and comprising a plate member forming part of the body, the plate member having a tag mounting portion so as to be exposed to an outside of the body and an RFID (radio frequency identification) tag being applied to the tag mounting portion for communication on radio waves; and
a metal sheet, i) arranged on an inside wall face of the plate member so as to be back-to-back with the RFID tag with the plate member located therebetween in a direction along which the radio waves are transmitted and received, and ii) formed to be larger in planar size than the RFID tag and to block the radio waves reflected from the inside of the body.

2. The container box according to claim 1, wherein the tag mounting portion is formed on an outside surface of the plate member.

3. The container box according to claim 2, wherein the metal plate is equal or larger in areal size to or than the tag mounting portion.

4. The container box according to claim 2, wherein the metal plate is made of either an aluminum foil having either an adhesive or a sticker, or a resin-film-laminated aluminum foil having either an adhesive or a sticker.

5. The container box according to claim 2, wherein the tag mounting portion is formed on part of the plate member, the part of the plate member having a thickness that allows a distance between the RFID tag and the metal plate to an amount equal to or more than $1/32$ of a wavelength of the radio waves.

6. The container box according to claim 5, wherein the part of the plate member has a thickness that allows a distance between the RFID tag and the metal plate to an amount equal to or more than $1/16$ of a wavelength of the radio waves.

7. The container box according to claim 1, wherein
the body comprises a box-shaped trunk portion having a first opening and a first cover covering the first opening,
the tag mounting portion is formed on a side of the first cover made to be opposed to a side of the trunk portion when the first cover is placed to cover the first opening of the trunk portion, the first cover serving as part of the plate member, and
the metal plate is arranged on the side of the trunk portion which is opposed to the side of the first cover on which the tag mounting portion is formed.

8. The container box according to claim 7, wherein
the trunk portion has four side plates combined in an unfolded and folded manner and has the first opening and a second opening opposed to the first opening in the unfolded state and
the cover further comprises a second cover covering the second opening.

9. The container box according to claim 8, wherein,
in a case where the trunk portion is folded into the four side plates which are then accommodated between the first and second covers which are then covered with each other, the metal plate is arranged on either an inner surface or an outer surface of the second cover, the inner or outer surface being opposed to the tag mounting portion formed on the first cover.

10. The container box according to claim 7, wherein the metal plate is equal or larger in areal size to or than the tag mounting portion.

11. The container box according to claim 7, wherein the metal plate is made of either an aluminum foil having either an adhesive or a sticker, or a resin-film-laminated aluminum foil having either an adhesive or a sticker.

12. The container box according to claim 7, wherein the tag mounting portion is formed on part of the plate member, the part of the plate member having a thickness that allows a distance between the RFID tag and the metal plate to an amount equal to or more than $1/32$ of a wavelength of the radio waves.

13. The container box according to claim 12, wherein the part of the plate member has a thickness that allows a distance between the RFID tag and the metal plate to an amount equal to or more than $1/16$ of a wavelength of the radio waves.

14. The container box according to claim 1, wherein the metal plate is equal or larger in areal size to or than the tag mounting portion.

15. The container box according to claim 1, wherein the metal plate is made of either an aluminum foil having either an adhesive or a sticker, or a resin-film-laminated aluminum foil having either an adhesive or a sticker.

16. The container box according to claim 1, wherein the tag mounting portion is formed on part of the plate member, the part of the plate member having a thickness that allows a distance between the RFID tag and the metal plate to an amount equal to or more than 1/32 of a wavelength of the radio waves when the interrogator generates the radio waves.

17. The container box according to claim 16, wherein the part of the plate member has a thickness that allows a distance between the RFID tag and the metal plate to an amount equal to or more than 1/16 of a wavelength of the radio waves.

18. The container box according to claim 17, wherein the part of the plate member, which provides the tag mounting portion, is thicker in thickness than a remaining part of the metal plate.

19. An administering system comprising:
a container box for carrying goods therein, wherein the container box comprises a body accommodating the goods in an inside of the body and comprises a plate member forming part of the body and having a tag mounting portion so as to be exposed to an outside of the body;
an RFID (radio frequency identification) tag applied to the tag mounting portion for communication on radio waves with an interrogator; and
a metal sheet, i) arranged on an inside wall face of the plate member so as to be back-to-back with the RFID tag with the plate member located therebetween in a direction along which the radio waves are transmitted and received, and ii) formed to be larger in a planar size than the RFID tag and to block the radio waves reflected from the inside of the body.

20. The administering system according to claim 19, wherein the interrogator is in charge of the communication on the radio waves with the RFID tag, the system further comprising a data processor communicably connected to the interrogator and formed to process data obtained by the communication.

* * * * *